(12) United States Patent
Perrone, Jr.

(10) Patent No.: US 6,328,058 B1
(45) Date of Patent: Dec. 11, 2001

(54) HOSE CLEARING DEVICE

(76) Inventor: Mathew R. P. Perrone, Jr., 210 S. Main St., Algonquin, IL (US) 60102

(*) Notice: Subject to any disclaimer, the term of this patent is extended or adjusted under 35 U.S.C. 154(b) by 0 days.

(21) Appl. No.: 09/781,739

(22) Filed: Feb. 12, 2001

(51) Int. Cl.⁷ ................ E03B 7/12; E03C 1/02; B08B 9/032
(52) U.S. Cl. .......... 137/240; 137/209; 137/899; 138/32
(58) Field of Search ................ 137/209, 240, 137/899; 138/32, 34; 141/65, 66; 251/148; 134/95.1, 99.1, 99.2, 166 C, 171; 237/80

(56) References Cited

U.S. PATENT DOCUMENTS

| | | | |
|---|---|---|---|
| 3,845,779 | * 11/1974 | Greene, Jr. | 137/209 |
| 4,246,926 | * 1/1981 | Morell | 137/240 |
| 4,809,732 | * 3/1989 | Buehler | 137/240 |
| 5,390,691 | * 2/1995 | Sproule | 137/899 |
| 5,433,246 | * 7/1995 | Horton | 137/209 |
| 6,237,620 | * 5/2001 | Ferguson | 138/34 |

* cited by examiner

*Primary Examiner*—George L. Walton

(57) ABSTRACT

A hose clearing device has a valve assembly at one end thereof, preferably a compressed air receiving valve; and, at the opposing end thereof, an attaching means for attaching the valve assembly to an elongated tube, the elongated tube requiring the substantial evacuation of undesired fluid therefrom.

6 Claims, 3 Drawing Sheets

HOSE CLEARING DEVICE

This invention relates to a hose clearing device and more particularly to a hose clearing device which fits on the hose and may receive compressed air therethrough.

BACKGROUND OF THE INVENTION

When storing items for the winter, it is necessary to remove the fluid, especially undesired fluid, therefrom. Typical items, from which fluid must be removed, include fluid lines on motor homes, garden hoses and similar fluid containing items. One good way of accomplishing such a fluid clearance is to run air therethrough. However, there is no efficient way to do that.

Typical of the underfed fluid in these hoses or elongated tubes is water. Because water expands in volume as it transitions to ice, such expansion can cause the hose to rupture, and the hose to be ruined.

On ships of the United States Navy, it is customary to use hoses to apply steam to pipes for the purpose of cleaning the pipes. Customarily, such hoses are stored on deck. Condensed water in the hoses can freeze and make the hoses difficult to use. In fact, such frozen condensate can even ruin the hoses. An efficient clearing of those hoses can provide a great advantage. No such clearing device or method exists.

It is also feasible to put antifreeze in the appropriate lines. However, the antifreeze can have difficulty. Not only is the antifreeze an environmental hazard, it is difficult to dispose of after use. Thus, a means for clearing the fluid out of lines is desirable.

SUMMARY OF THE INVENTION

Among the many objectives of this invention is the provision of a fluid clearing device in the form of a valve assembly, capable of being removably attached to the elongated fluid container in air tight fashion.

Another objective of this invention is to provide a valve assembly to assist with passing air through an elongated member.

Yet another objective of this invention is to provide a valve assembly attachable to a male hose fixture.

Still, another objective of this invention is to provide a valve assembly attachable to a female hose fixture.

Additionally, an objective of this invention is to provide a valve assembly attachable to a hose without a fixture.

A further objective of this invention is to provide a valve assembly attachable to a hose with a snap assembly.

A still further objective of this invention is to provide a valve assembly attachable to a variety of hoses with an adapter.

Yet a further objective of this invention is to provide a valve assembly attachable to a steam hose in order to remove condensate therefrom.

These and other objectives of the invention (which other objectives become clear by consideration of the specification, claims and drawings as a whole) are met by providing a valve assembly having at one end thereof, for example, a compressed air receiving valve; and, at the opposing end thereof, an attaching device for securing the valve assembly to an elongated tube requiring the substantial evacuation of fluid therefrom.

BRIEF DESCRIPTION OF DRAWINGS

Throughout the figures of the drawings where the same part appears in more than one figure, the same number is applied thereto.

DESCRIPTION OF PREFERRED EMBODIMENTS

For the hose clearing mechanism, a valve assembly is present at one end thereof and a hose attachment is present at the other end thereof. The hose clearing mechanism includes a male or female member or other attaching mechanism on one end thereof for attaching to a hose, a fluid line of a recreational vehicle, a pipe for a swimming pool or other elongated tube. Reference to hose may include any and all types of an elongated tube, whether the elongated is flexible or rigid, or has other qualities.

A desired fluid for removing an undesired fluid such as water is air. This hose clearing mechanism with its attaching mechanism and air valve works well for clearing a hose or other elongated tube.

On the other end is a standard valve. This valve may receive a standard air hose from a hand pump or a compressor. As the valve is fastened to the end of the hose, with the attaching device by screwing or other relationship, the valve is secured to the hose. Air can then be applied to the valve, pass through the attaching device, and force the water out of the hose. In this fashion, the vehicle or hose, or other implement or elongated piece of tubing can be prepared for winter and have the fluid removed therefrom in an efficient manner without the use of antifreeze.

This air valve assembly is especially useful for clearing the steam carrying hoses customarily used by the United States Navy on board ships. Various pipes on ships are cleaned by these steam hoses. This air valve assembly can effectively clear the hoses for on deck storage.

Figure 1:
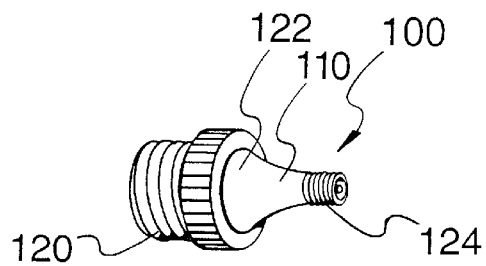
FIG. 1 depicts a perspective view of the hose clearing device 100 of this invention with male attachment 120.
Figure 2:
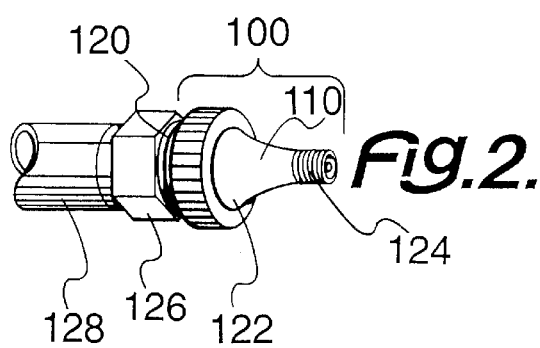
FIG. 2 depicts a perspective view of the hose clearing device 100 of this invention from FIG. 1 in use.
Figure 3:
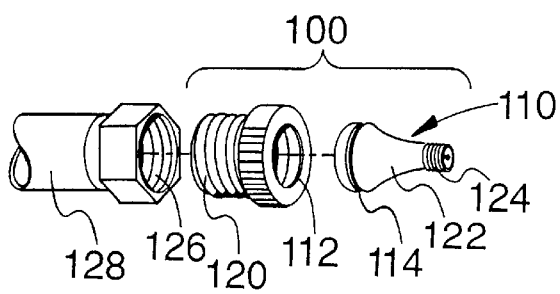
FIG. 3 depicts an exploded perspective view of the hose clearing device 100 of this invention from FIG. 1 in use.

Referring now to FIG. 1, FIG. 2 and FIG. 3, the hose clearing mechanism 100 has an air valve assembly 110 with a male hose attachment 120 thereon. Air valve assembly 110 is a standard valve assembly with a valve housing 122 and a valve stem 124. Valve stem 124 permits air to pass through valve housing 122, when valve stem 124 is contacted the air hose (not shown) from a compressor (not shown) or other air source. With male hose attachment 120, valve assembly may be secured to the female end 126 of hose 128. As compressed air is applied to valve assembly 110, any liquid in hose 128 is expelled therefrom.

Particularly in FIG. 3, valve collar 112 in male attachment 120 receives seat groove 114 in air valve assembly 110. This structure permits an air tight fit between air valve assembly 110 and male attachment 120.

Figure 4:
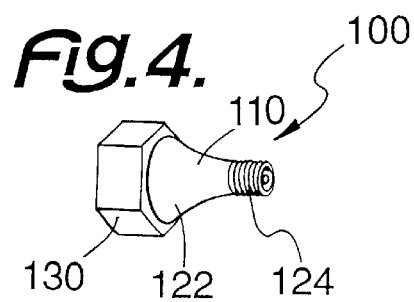
FIG. 4 depicts a perspective view of the hose clearing device 100 of this invention with female attachment 130.
Figure 5:
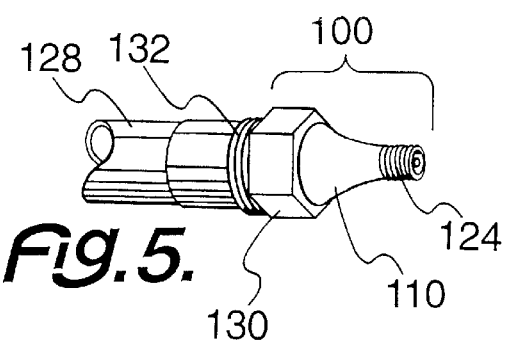
FIG. 5 depicts a perspective view of the hose clearing device 100 of this invention from FIG. 4 in use.
Figure 6:
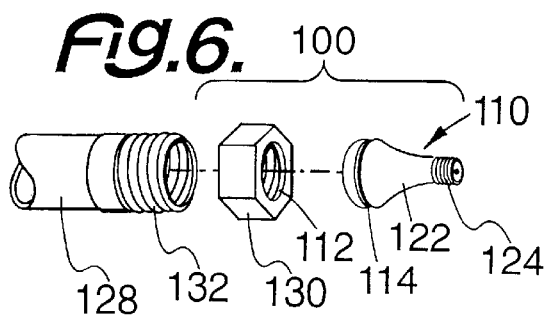
FIG. 6 depicts an exploded perspective view of the hose clearing device 100 of this invention from FIG. 4 in use.

Referring now to FIG. 4, FIG. 5 and FIG. 6, the hose clearing mechanism 100 has an air valve assembly 110 with a female hose attachment 130 thereon. Air valve assembly 110 is again the standard valve assembly above described. Valve stem 124 permits air to pass through valve housing 122. With female hose attachment 130, valve assembly 110 may be secured to the male end 132 of hose 128. As compressed air is applied to valve assembly 110, any liquid in hose 128 is expelled therefrom.

Particularly in FIG. 6, valve collar 112 in female attachment 130 receives seat groove 114 in air valve assembly 110. This structure permits an air tight fit between air valve assembly 110 and female attachment 130.

Figure 7:
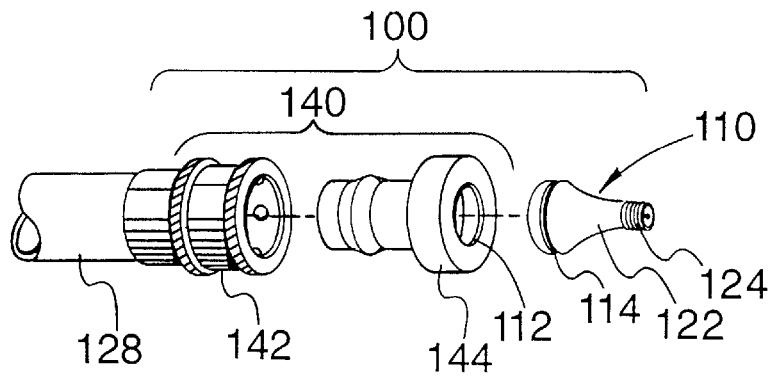
FIG. 7 depicts a perspective view of the hose clearing device 100 of this invention with snap attachment 140.

In FIG. 7, female hose attachment 130 of FIG. 4 is replaced with snap attachment 140. Snap attachment 140 has a female snap assembly 142 adapted to receive male snap assembly 144, on hose 108. The clearing procedure is then repeatable. Female snap assembly 142 and male snap assembly 144 may have their positions reversed, as shown by comparing FIG. 1 and FIG. 4.

Figure 8:
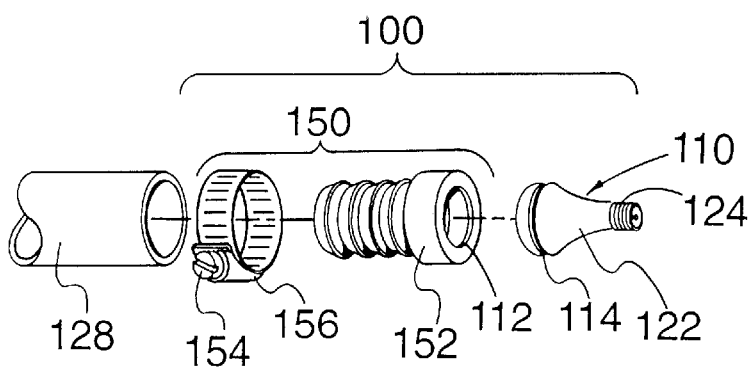
FIG. 8 depicts a perspective view of the hose clearing device 100 of this invention with clamp attachment 150.

In FIG. 8, clamp attachment 150 replaces snap attachment 140. Clamp attachment 150 has a female clamp assembly 152 adapted to receive hose 108 in a female to male relationship. Clamp screw 154 of hose clamp 156 secures hose clamp attachment 150 to hose 108. Clamp attachment 150 is adaptable to almost any diameter of hose 108. The clearing procedure is then repeatable.

As in FIG. 4 and FIG. 6, FIG. 8 has valve collar 112 in female clamp assembly 152 receiving seat groove 114 in air valve assembly 110. This structure permits an air tight fit between air valve assembly 110 and female clamp assembly 152.

Figure 9:
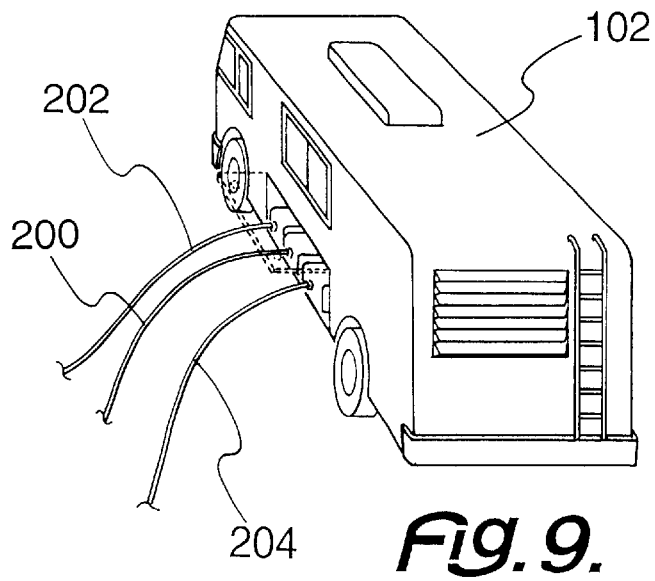
FIG. 9 depicts a perspective view of the hose clearing device 100 of this invention in use on a recreational vehicle 102.

Adding FIG. 9 to the consideration, hose clearing device 100 may be attached to the recreational vehicle 102. It may be attached to the grey water line 200 or the potable water line 202, or the sewer water line 204, and clear any one of those lines of fluid.

Figure 10:
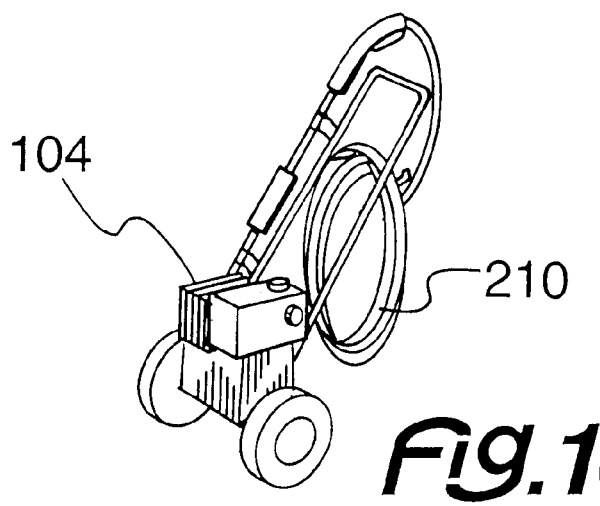
FIG. 10 depicts a perspective view of the hose clearing device 100 of this invention in use on a power washer 104.

Another variation is shown in FIG. 10, in that, hose clearing device 100, is attached to power hose 210. In that way, hose clearing device 100 can clear a power hose 210.

Figure 11:
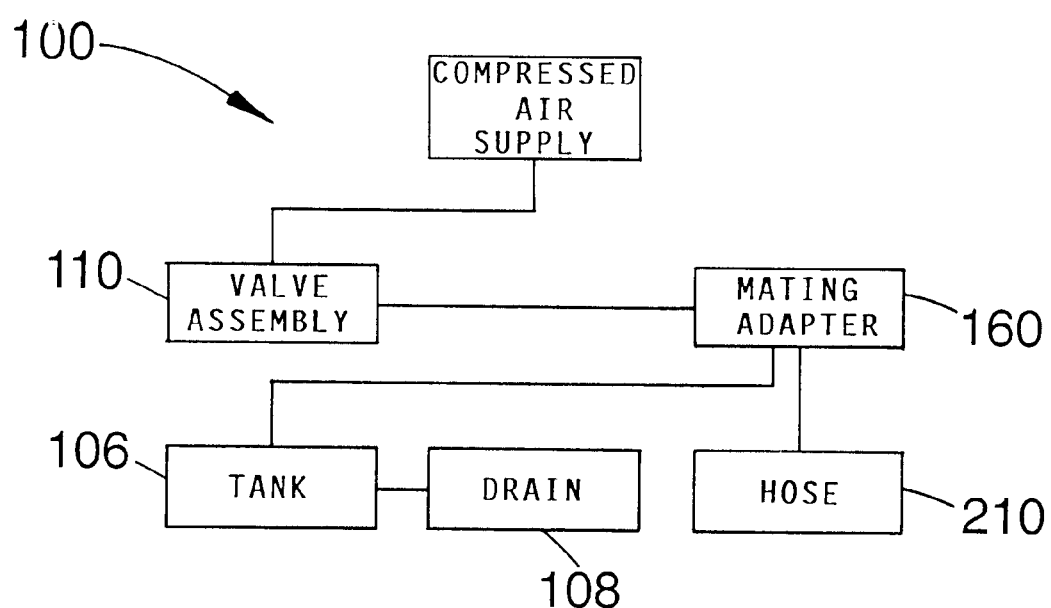
FIG. 11 depicts a block diagram of the hose clearing device 100 of this invention in use.

Referring now to FIG. 11, a block diagram of hose clearing device 100 in use is shown. It is also possible to have only one hose clearing device 100. Hose clearing device 100 has any type of mating member 160 oppositely disposed from the valve assembly 110. A mating member 160 can then fit the hose clearing device 100 at the end opposed to valve assembly 110. The mating member 160 can have or be adapted to have any type of fitting at an opposing end thereof. That mating member 160 can permit hose clearing device 100 to fit any number of different hose fittings or other elongated members. With air flowing from compressed air source 174, or gas flow producing device through a variety of hoses, antifreeze use is at least reduced, and quite possibly avoided.

With any type of fitting 172, hose clearing device 100 may fit any type of elongated hollow member and remove fluid or liquid therefrom. Thus it may be seen that hose clearing device 100 may remove fluid or liquid from any type of elongated member.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the united states is:

1. A hose clearing device consisting essentially of:
    (a) a fluid receiving valve at one end of the hose clearing device being adapted to pass a desired fluid through a hose;
    (b) a removable connecting means having a first end and a second end at another end of the hose clearing device;
    (c) the first end of the removable connecting means being adapted for securing to one end of a hose;
    (d) the second end of the removable connecting means being adapted for securing to the fluid receiving valve;
    (e) the fluid receiving valve being releasably securable to the connecting means and adapted to pass the desired fluid through the hose;
    (f) the fluid receiving valve being snap fitted to the connecting means in order to provide for easy replacement thereof; and
    (g) the connecting means receiving the desired fluid from the fluid receiving valve and passing the desired fluid through the hose, in order to remove an undesired fluid from the hose and to guard against freezing of the hose.

2. The hose clearing device of claim 1 further comprising:
    (a) the fluid receiving valve being an air valve;
    (b) the desired fluid being air; and
    (c) the connecting means being selected from the group consisting of a male attachment and a female attachment.

3. The hose clearing device of claim 2 further comprising:
    (a) the fluid receiving valve being adapted to accept an air hose; and
    (b) an adapter for the attaching means permitting the hose clearing device to be attached a plurality of hoses.

4. The hose clearing device of claim 2 further comprising the attaching means being including a threaded member adapted for a threaded relationship with the hose.

5. The hose clearing device of claim 2 further comprising the attaching means being including a snap fitted member adapted for a snap on relationship with the hose.

6. The hose clearing device of claim 2 further comprising the attaching means being including a clamping member adapted for a clamping relationship with the hose.

* * * * *